United States Patent [19]
Okamoto et al.

[11] 3,847,448
[45] Nov. 12, 1974

[54] APPARATUS FOR ANTISKID CONTROL OF A HYDRAULIC BRAKE SYSTEM

[75] Inventors: Toshaiaki Okamoto; Masammi Inada: Koji Nishida, all of Toyota, Japan

[73] Assignees: Aisin Seiki Company Limited, Aichi-ken; Sharp Kabushiki Kaisha (Sharp Corporation), Osaka, both of, Japan

[22] Filed: Oct. 10, 1972

[21] Appl. No.: 297,876

Related U.S. Application Data

[63] Continuation of Ser. No. 888,297, Dec. 31, 1969, abandoned.

[52] U.S. Cl............................ 303/21 BE, 303/20
[51] Int. Cl................................................ B60t 8/08
[58] Field of Search....... 188/18; 303/20, 21; 317/5; 324/161–162; 340/52 R, 53, 262–263; 307/10 R

[56] References Cited
UNITED STATES PATENTS

| | | | |
|---|---|---|---|
| 3,245,213 | 4/1966 | Thompson et al. | 303/21 EB |
| 3,482,887 | 12/1969 | Sheppard | 303/21 BE |
| 3,535,004 | 10/1970 | Howard et al. | 303/21 EB |
| 3,578,819 | 5/1971 | Atkins | 303/21 BE |
| 3,582,152 | 6/1971 | Burckhardt et al. | 303/21 EB |
| 3,614,173 | 10/1971 | Branson | 303/21 P |
| 3,640,588 | 2/1972 | Carp et al. | 303/20 X |
| 3,653,727 | 4/1972 | Kullberg et al. | 303/20 X |
| 3,682,515 | 8/1972 | Packer et al. | 303/21 BE |

Primary Examiner—Trygve M. Blix
Assistant Examiner—Stephen G. Kunin
Attorney, Agent, or Firm—Cumpston, Shaw & Stephens

[57] ABSTRACT

An anti-skid brake control system for hydraulically braked vehicle wheels senses and regulates the deceleration of one of the braked wheels and uses the mean speed of this wheel to compare with the sensed speed of another wheel whose braking is controlled to conform to the first wheel. Preferably the first wheel is selected as most likely to skid, and the other wheel is one having superior braking ability.

7 Claims, 4 Drawing Figures

APPARATUS FOR ANTISKID CONTROL OF A HYDRAULIC BRAKE SYSTEM

RELATED APPLICATIONS:

This is a continuation of application Ser. No. 888,297, filed Dec. 31, 1969, now abandoned.

This invention relates to improvements in and relating to a method for the skid prevention control of a hydraulic brake pressure in a hydraulic brake system including a plurality of vehicle wheels and to an arrangement adapted for carrying out said method.

According to the conventional technique, the antiskid brake control is carried into effect in such a way that an impending or already invited lock of at least one front or rear vehicle wheel is sensed and the thus sensed results are utilized for control of the brake conditions of both the front wheels and the rear wheels.

In the regular automotive vehicle, the rear wheels are loaded lighter than the front wheels and a lock will appear at the rear wheel side sooner than the front wheel side. When, as conventionally, the rear wheel lock is sensed and the hydraulic brake pressure is released at the rear wheel side, as well as the front wheel side, there arises such a considerable drawback that in spite of the still reserved braking capability at the front wheel side, the front wheels are released from their braked position, which means a corresponding loss of braking force, thus the overall braking period extending disadvantageously longer than the ideal.

It would be easily conceivable to fit each of all the vehicle wheels with a separate sensor and brake pressure control means, for the purpose of obviating the aforementioned drawback and providing each wheel with an individual and optimum brake pressure control effect so as to make proper adaptation to various and different road conditions relative to each of the wheels, thereby realizing a nearly ideal antiskid brake control operation. Such measure, even if practically adopted, would be too much complicated in its design and thus uneconomical for the industrial purpose.

It is therefore the main object of the invention to provide a method adapted for the realization of efficient brake pressure control, taking occasional and highly variable road surface conditions into account and in a highly simplified way in comparison with easily accessible otherwise technical measures serving for this purpose.

It is a further object to provide an arrangement of a highly simplified design and nevertheless adapted for carrying out the method according to the invention.

It is still a further object of the invention to provide a method and an arrangement for the realization of same, capable of braking the vehicle wheels at a smallest possible stopping distance for the vehicle, when an emergency brake is applied to the wheels thereof.

We have found, based upon a large number of practical experiments that when the wheel rotational speed is kept about 20% below the occasional vehicle speed during application of a braking upon the wheels of a powered vehicle, a practically maximum braking effect can be realized, especially in the case of a sudden and considerable application of the brake. It is therefore a most efficient and economical braking way that a sudden and considerable brake is applied to decelerate the vehicle wheel rotation; the rear wheel or wheels is/are first sensed of its excess deceleration so as to release its hydraulic brake pressure as being applied thereto; the pressure reducing instruction signal is interrupted for brake re-application, when the related wheel speed recovers its rotational speed near to the occasional vehicle speed, and so on, so as to control the braking of the rear wheel means so that the overall speed behavior thereof resembles as nearly as possible with an ideal brake characteristic curve assumed for the rear wheels, said ideal curve being presumed to be about 20% lower than the overall speed behavior of the real vehicle speed reduction during the whole range of the brake application, while the front wheels are also subjected to braking substantially in the similar manner to that of the rear wheels. During performing the repeated brake application and brake release of the rear wheels, the mean wheel velocity corresponding generally to about a 20 percent-reduction from the occasional moving velocity of the vehicle is compared with the occasional rotational velocity of the front wheels, thus the difference between the both being sensed. When the front wheel speed is lower than the mean speed of the rear wheel, the pressure reducing instruction signal for the front wheel is interrupted for the release of the brake pressure applied thereto and for the reinitiation of wheel acceleration, so as to recover the rotational speed of the front wheels to the mean occasional rotational speed of the rear wheel, and so on.

In the practice of the invention, it is highly recommendable to establish a simulated vehicle speed optimum for skid prevention and based upon the rotational speed either of the rear side or front side wheel, and the rotational speed of the other side wheel is compared so as to maintain the ratio between the both at an optimum value adapted for giving a maximum braking effort, thus attaining a loss-free skid-preventing operation.

These and further objects, features and advantages of the present invention will appear more apparent, when read the following detailed description of the invention by reference to the accompanying drawings illustrative of substantially two preferred embodiments of the invention.

In the following, several preferred embodiments of the invention will be described in detail by reference to the accompanying drawings.

Figure 1:
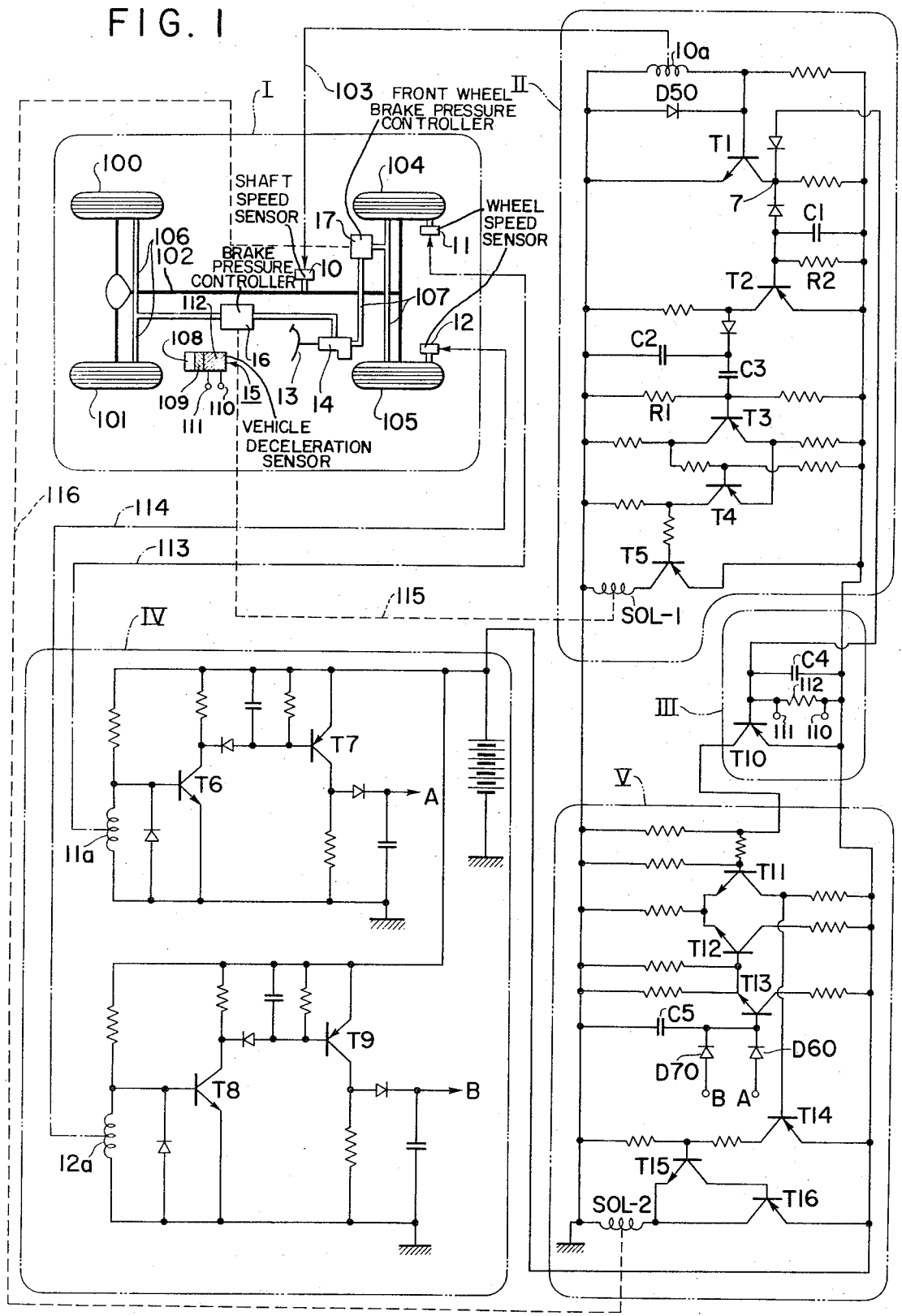
FIG. 1 is a schematic view of a first embodiment of the arrangement adapted for carrying out the method according to this invention, together with an electronic circuit diagram employed therein.

In FIG. 1 illustrative only schematically of the first embodiment of the invention, a first block I represents a section which is designed and arranged to perform vehicle and wheel speed sensing operation, thus this section being referred to briefly as "speed sensor section" throughout this specification; a second block II stands for a section which is adapted for performing a skid signal amplification and descrimination and an operational instruction delivery function at the side of the simulated vehicle speed establishing and processing part of the arrangement of the invention. A third block III represents a section which is designed and arranged to deliver a simulated vehicle speed signal, a fourth block IV is a section which is adapted for amplifying a skid signal relating to the vehicle wheels used as a control and for comparison with other signals. A fifth or final block V is a section which performs a comparison between fed signals and delivers an operation signal adjudged from the comparative results.

More specifically in FIG. 1, the numeral 10 denotes a speed meter type sensor of conventional type and arranged to be common to automotive rear wheels 100 and 101. For this purpose, this sensor 10 is arranged, as shown schematically, to cooperate with the conventional propeller shaft 102 of the vehicle, and to deliver a series of electric pulses depending upon the rotational speed of the shaft, the thus established electric pulses being fed through a lead 103 to a coil 10a included in the instructing section II. Further speed sensors 11 and 12 of the similar nature as above are arranged and provided respectively for vehicle front wheels 104 and 105.

On the vehicle, there is provided as conventionally a foot-operated brake pedal 13 which is mechanically connected a master cylinder 14 being shown only schematically by a block. The pressurized hydraulic liquid, preferably oil, when manual pressure is applied to the pedal 13, will be conveyed through conventional brake pressure controllers 16 and 17 inserted respectively in brake pipings 106 and 107 to rear and front wheel cylinders, not shown, attached to said wheels 100, 101 and 104, 105 respectively as in the conventional way.

A vehicle speed sensor unit, generally shown at 15, is provided on the vehicle, although its mounting and attaching means thereto have been omitted only for the simplicity of drawing. This sensor unit 15 may be of the conventional design and comprises, in the preferred form shown, a pressure responsive resistor 112 upon which an inertia mass 109 exerts a pressure depending upon the occasional deceleration of the vehicle. A weak spring means, only schematically shown, exerts a predetermined light pressure through said inertia mass 109 upon the pressure responsive resistor 112 when the vehicle is subjected to no acceleration or deceleration, so as to provide a certain electric resistance as measured at the resistor. This unit 15 comprises a pair of terminals 110 and 111 which are electrically connected with the resistor 112 as shown.

It is believed that from the foregoing that the design, arrangement and function of the speed sensor action I can be completely understood.

Voltage pulses generated in and delivered from the rear wheel speed sensor 10 are applied through lead 103 to sensing 10a, as was already referred to. With increased rotational speed of the propeller shaft 102, more numerous pulses per unit time will naturally be generated and delivered and the received pulses in the sensing coil 10a are then amplified in a transistor T1 and accumulated in a condenser C1. With more numerous voltage pulses fed in the above mentioned way, corresponding to a higher rotational speed of the propeller shaft, a higher voltage will be accumulated in the condenser, and vice versa. This voltage is voltage amplified at a further transistor T2 and then accumulated in a condenser C2. This voltage is fed to a differentiator comprising a condenser C3 and a resistor R1, so as to detect in effect the occasional deceleration of the rear wheels 100 and 101 in the mean, the thus sensed value being fed to the base electrode of transistor T3 which is a member of a Schmitt circuit shown, comprising a further transistor T4. The transistor T3 is normally off, while the transistor T4 is normally on. When a signal showing the occasional rear wheel deceleration to be larger than a predetermined value, transistor T3 is turned on and thus transistor T4 is turned off, thereby transistor T5 becoming conductive and an actuating solenoid SOL-1 electrically connected therewith as shown being energized for actuation. Although not specifically shown, this solenoid SOL-1 is so designed and arranged that it cooperates with the master cylinder 14 and the brake pressure controller 16 for cutting off the hydraulic master cylinder pressure and releasing the rear wheel hydraulic brake pressure.

It is believed that with the foregoing detailed description, the design, arrangment and function of the second section II for performing skid signal amplification, signal descrimination and rear wheel hydraulic brake pressure release can clearly be understood.

It will be easily supposed that either of the speed sensors 11 and 12 generates a series of pulses representing the occasional running speed of the related front wheel 104 or 105 and feeds them to respective sensing coils 11a or 12a through respective leads 113 and 114 shown only in a simplified way by respective dash-dotted lines. Either of these pulse series signals is amplified through a pair of series-connected transistors T6; T7 or T8; T9. Thus, it will be easily seen that a higher or lower voltage depending upon the occasional rotation of front wheel 104 or 105 will appear at an output terminal "A" or "B" of the fourth section IV which can be called therefore as "amplifying and descriminating section for controlled wheel signals.".

In the next step, a comparison of respective pressure reducing signals for the front and rear wheels must be carried into effect. This operation may be performed in the following way.

The pulses delivered from the brake pressure controller 16 and representing a mean value of the respective rear wheel hydraulic brake pressures are accumulated in the condenser C4 and the mean value of the rear wheel running speeds in the form of series pulses delivered from speed sensor 10 is accumulated in the condenser C1. It should be noted at this stage of description that the time constant defined by the occasional resistance value at the resistor 112 and the capacitance at the condenser C4 belonging to third section III is selected to be larger than that which is determined by resistor R2 and condenser C1. The purpose of this measure is to equalize the occasionally variable running speed of the rear wheels, by providing a certain long time lag. When the first time constant in the above sense has a considerably large value, a nearly real and accessible means value of the variable rear wheel rotational speeds will be obtained if the wheels roll on a muddy, snow-covered or other unfavorable road surface providing a lower value of adhesion coefficient, thus requiring a longer braking period for attaining a certain constant braking effect on the rolling wheels. On the contrary, when the vehicle runs along a favorably conditioned road surface such as paved one, representing a higher value of adhesion coefficient, the mean rotational speed of the rear wheels will approach sooner towards nil when taking a unit time of braking period as a judging measure, because the braking period in this case for attaining a certain constant braking effect on the running rear wheels is considerably longer than the former case. With use of a speed simulating circuit shown in the upper part of FIG. 1 wherein the time constant is assumed to be a larger value, the mean rotational value thus simulated would become higher than the practical value. It is therefore necessary to adapt the time constant in the above sense to occasional conditions of the road surface.

When a vehicle wheel brake is applied with a sudden and considerable braking force, the resulting deceleration of the vehicle depends upon the road surface conditions. Under favorable running conditions of the road, a correspondingly higher deceleration will result, and vice versa. When the vehicle is subjected to a more considerable braking action, the electric resistance value as measured at the terminals 110 and 111 of deceleration sensor 15 shown in FIG. 1 will be correspondingly smaller, and vice versa. In this way, therefore, the necessary compensation for the occasional road surface conditions may be satisfied. It will be therefore understood the voltage appearing across the condenser C4 will substantially to the mean value of the varying rotational speed of the rear wheel for a certain preselected time period.

The aforementioned voltage is then amplified in transistor T10 and the amplified output voltage therefrom is applied to the base electrodes of transistors T11 and T12.

On the other hand, the rotational speed of the front wheels 104 and 105 converted into corresponding voltages appear at respective terminals A and B of which voltages the higher one will be accumulated in condenser C5 through diode D60 or D70 shown in the upper part of FIG. 1 and kept in connection with said terminals. This voltage is amplified through transistor T13 and then applied to the base electrode of another transistor T12 of the differential amplifier. When the voltage applied to the base of transistor T12 becomes lower than a predetermined value or there appears a difference relative to the voltage applied to the base of transistor T11, the output is detected at transistor T14, thereby actuating transistors T15 and T16 for conducting an energizing current through solenoid SOL-2. This solenoid constitutes the actuating member for the hydraulic brake pressure control unit 17 for front wheels 104 and 105, as in the similar manner of the first mentioned solenoid coil SOL-1 relative to the rear wheel hydraulic pressure control unit 16 as hinted by respective dotted lines 115 and 116. By actuation of the pressure control unit 17, the front wheel hydraulic brake pressure is isolated from the master cylinder pressure, so as to realize a brake pressure reduction relative to the front wheels.

Figure 2:
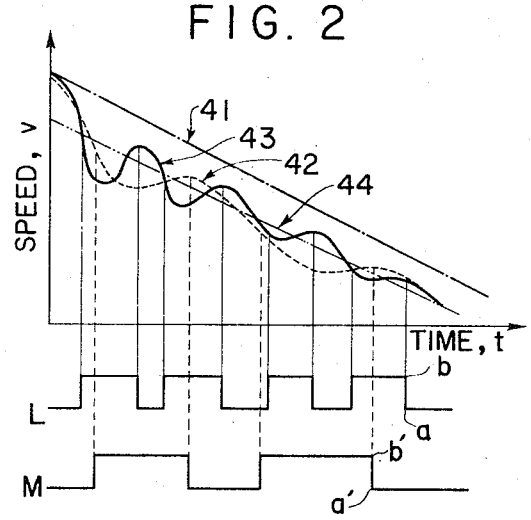
FIG. 2 is an explanatory chart for the illustration of the functions of several main constituent sections contained in the arrangement shown in FIG. 1.

The aforementioned operation of the arrangement adapted for the prevention of wheel skid will appear more apparent at a glance of FIG. 2 which shows a chart on which several speeds have been plotted against time. In this chart an inclined dash-dotted curve 41 represents the vehicle speed; dotted line curve 42 the front wheel rotational speed; the full line curve 43 the rear wheel rotational speed; the chain-dotted line 44 represents the mean rear wheel speed which lies at a lower level about 20 percent less than the vehicle speed curve 41. The signal form "L" represents a series of instruction signals for rear wheel hydraulic brake pressure control release, while the signal form "M" represents a series of instruction signals for release of front wheel hydraulic brake pressure control. In this chart, the level denoted $a$ or $a'$ represents application, while that denoted $b$ or $b'$ represents brake release.

It should be noted that the inclined straight-line like curve 44 which lies about 20 percent below the vehicle speed curve for providing a maximum possible brake effect appearing in the whole course of a brake application step as ascertained by a large number of practical experiments. As seen, the anti-skid brake pressure control operation, comprising deceleration sensing, hydraulic brake pressure release, recovery of wheel speed towards occasional vehicle speed, reapplication of brake by interruption of brake pressure reducing instruction signal, and so on, for rear wheels during a sudden and considerable brake application thereto is carried into effect along the curve 43, while the front wheels are subjected, relying upon these results, to speed reduction along the curve 42 until it reaches the mean rear wheel speed curve 44.

Under certain conditions, the front wheels may be replaced in the foregoing description by the rear wheels.

Next, referring to FIGS. 3 and 4 a second embodiment of the invention will be described in detail.

Figure 3:
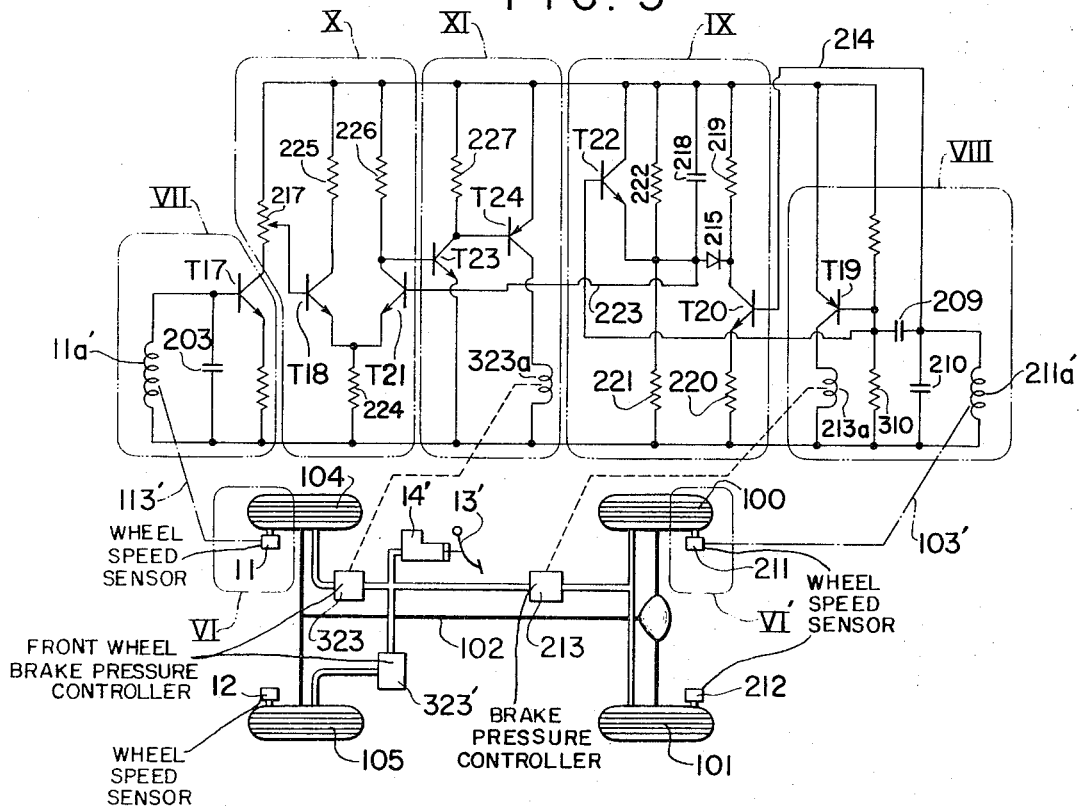
FIG. 3 is a similar view to FIG. 1, illustrative of a second embodiment of the arrangement of the nature set forth in the foregoing.

In FIG. 3, front and rear wheels of the vehicle are denoted with 104; 105 and 100; 101, respectively as before. The propeller shaft is shown by 102 again as before. Front wheels 104 and 105 are provided with speed sensors 11 and 12, respectively, as before. In this embodiment, front wheel 104 and its speed sensor 11 constitute in combination a first vehicle speed sensing element as denoted by a block VI. In the similar way, rear wheels 100 and 101 are provided respectively with speed sensors 211 and 212. Rear wheel 100 and its speed sensor 211 constitute in combination a second vehicle speed sensing element as denoted by a block VI'. These elements VI and VI' constitute in combination a vehicle speed sensing section. Sensors 11 and 211 are connected electrically through respective leads 113' and 103' to sensing coils 11a' and 211a', respectively. Outputs from these sensors are accumulated in condensers 203 and 210, respectively. The voltage across the condenser 203 and representative the occasional rotation of front wheel 104 is amplified through a transistor T17 and the thus amplified voltage is then applied to the base of transistor T18.

Sensing coil 11a', condenser 203 and transistor T17 constitute a front wheel speed signal amplifying section VII, as denoted by a block.

As was referred to above, the accumulated voltage in condenser 210 corresponds to the occasional running speed of rear wheel 100; said voltage is fed to a differentiator comprising condenser 209 and resistor 310, so as to determine occasional deceleration degree. When this deceleration degree should exceed a predetermined value, a transistor T19 is turned conductive, so as to energize a solenoid 213a which constitutes the main actuating element of rear wheel brake pressure controller 213, preferably shaped into a solenoid operated control valve, for interrupting fluid communication of conventional rear wheel cylinders, not shown, with master cylinder 14' mechanically connected with foot-operated brake pedal 13', thereby reducing the rear wheel hydraulic brake pressure downstream of said pressure controller 213.

Sensing coil 211a', condensers 209 and 210, resistor 310, transistor T19 and solenoid 213a constitute a rear wheel deceleration signal amplifier and hydraulic brake pressure control instruction signal generator section VIII, as denoted by a block.

A pole of condenser 210 is connected through a lead 214 to the base electrode of a transistor T20, so as to amplify thereby the condenser voltage.

Vehicle speed simulator section IX contains transistor T20, diode 215, resistors 219, 220, 221 and 222, condenser 218 and transistor T22 connected with each other as shown and encircled by a block. Amplified output of transistor T20 is conveyed through one end of condenser 28 and lead 223 to the base of a transistor T21 of differential amplifier X which contains the transistor T18. The voltage fed to transistor T21 and the voltage applied to the base of transistor T18 have a relative ratio, preferably 20 percent. Control of this voltage ratio is performed by manipulating a variable resistor 217. With a suitably preset ratio between the voltages by manipulating the variable resistor 217, the related voltages are applied to the transistors T18 and T21.

Differential amplifier section X contains transistors T18 and T21, variable resistor 217 and several fixed resistors 224, 225 and 226 connected with each other as shown.

In the present embodiment, the voltage representing vehicle speed is derived from the angular acceleration developed upon release of rear wheel hydraulic brake pressure, said voltage being thus a kind of vehicle speed simulation voltage. When a higher acceleration is sensed, it can be definitely assumed that the road conditions at this instance are favorable and the adhesion coefficient is considerably large. In this case, the condenser voltage at 218 is reduced, while the time constant established by resistor 219 and condenser 218 is also reduced for making the discharge of the accumulated voltage in the condenser 218 more easily than hithertofore.

On the contrary, when the sensed acceleration in the above sense is smaller, the equivalent resistance at the transistor T22 will be increased and the discharge of the accumulated voltage in the condenser 218 will become more difficult. In this way, a voltage accurately simulated to the practical vehicle speed can be obtained by relying upon the occasional rotational speed of the rear wheels.

The output voltage is applied to the base of transistor T21 so as to perform a comparison with the corresponding voltage concerning the front wheels. When the ratio between the voltages concerning the front wheels and the rear wheels exceeds a predetermined value, transistors T23 and T24 will be turned on, thereby current being conveyed through actuating solenoid 323a constituting the main actuating means of front wheel hydraulic brake pressure controller 323 for interrupting the related brake pressure from the master cylinder 14', said controller being preferably formed into a solenoid-operated control valve assembly highly popular among those skilled in the art and thus shown only schematically by a block. At this stage, the controller 323 will act to reduce the front wheel brake pressure, in addition to said hydraulic pressure interruption. Controller 323' is controlled in a similar way as the controller 323. In this way, front wheel skid can be positively prevented. Transistors T23 and T24, fixed resistor 227 and actuating solenoid 323a connected electrically with each other as shown, constitute in combination a front wheel pressure control instruction generator XI, as hinted by a block attached with the symbol XI.

Figure 4:
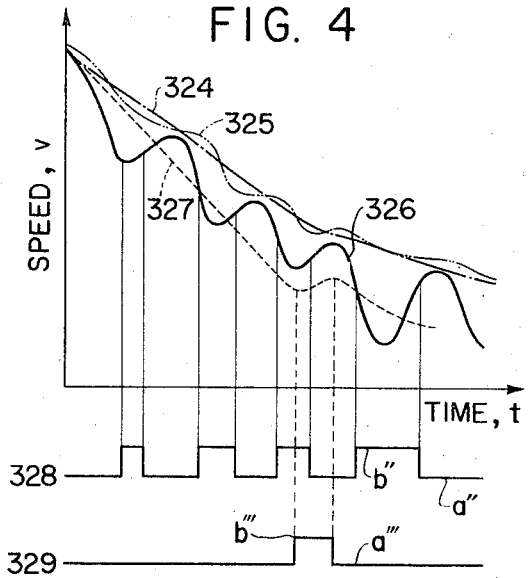
FIG. 4 is a similar view to FIG. 2 which is an explanatory chart compiled with reference to said second embodiment.

The operation of the wheel skid preventing arrangement will be more clearly understood by a glance at FIG. 4 which shows a similar chart shown in foregoing FIG. 2. In this chart, curve 324 represents practical wheel speed; curve 325 the simulated wheel speed; curve 326 the right hand side rear wheel rotational speed; curve 327 the right hand side front wheel rotational speed; upper signal form 328 the pressure reducing instruction signal for right hand side rear wheel; lower signal form 329 the brake pressure reducing instruction signal for right hand side front wheel. a'' and a''' represent respective brake application, while b'' and b''' represent respective brake pressure release.

The operation is briefly as follows.

A vehicle speed simulation curve 325 is obtained by means of the vehicle speed simulation section IX and based upon the real vehicle speed curve 324. Since, as was referred to briefly hereinbefore, it has been ascertained by a number of practical experiments that an optimum skid preventing effect can be attained by employing a 20 percent - reduction of the vehicle speed relative to the speed simulation curve 325, the curve 327 or the like is set so as to have generally a ratio of 1 : 0.8 being maintained relative to the former. The skid preventing operation can be attained by controlling the hydraulic brake pressure in such a way that the curve 327 takes 80 percent of the value of curve 325.

Plotting of the vehicle simulation curve as at 325 may be performed, as an example, in the following way:

First assuming that the vehicle runs on a most unfavorable road surface conditions as encountered in the vehicle drive on a snow-covered road. Under these assumed conditions, the proper value of main circuit elements such as condenser 218, resistor 219 and transistor T22 comprised in the vehicle speed simulating section IX are determined, for providing a properly selected time constant. By adopting this measure, the electrical discharge curve is corrected depending upon the provided acceleration value upon brake pressure reduction with use of said time constant. The thus corrected curve corresponds to that for a simulated vehicle speed.

The embodiments of the invention in which an exclusive property or privilege is claimed are as follows:

1. An apparatus for the antiskid brake control of a plurality of front and rear wheels of a powered and wheeled vehicle, comprising means for sensing the revolutions per unit time of each of said wheels and for issuing output signals responsive to the sensed wheel revolutions, and an actuator for regulating the respective wheel brake pressure in response to said output signals, said apparatus further comprising in combination:

a. a first means for delivery of an electrical voltage in response to the said output signal corresponding to the revolutions of one of the wheels, for providing a wheel decelerating signal thereof;

b. a second means for generating a brake pressure control signal for effecting a pressure control action at the brake means for said one wheel, when said wheel deceleration signal exceeds a predetermined value;
c. a third means comprising a capacitor for accumulation of an output signal corresponding to the revolutions of a pair of wheels, and a discharge circuit for discharging the charge accumulated in said capacitor in response to the acceleration of said one wheel when said brake means for said one wheel is released, thereby establishing a pseudo vehicle speed signal;
d. a fourth means for generating a voltage in response to said output signal from a remaining one of said wheels, thereby providing a wheel speed signal for said remaining wheel;
e. a fifth means for obtaining a comparison signal upon comparing said remaining wheel speed signal with said pseudo vehicle speed signal; and
f. a sixth means for generation of a brake pressure control signal responsive to said comparison signal for control of the brake pressure applied to said remaining vehicle wheel.

2. The apparatus as claimed in claim 1 wherein said fourth means includes a comparison circuit arranged to provide said remaining wheel speed signal as a maximum value determined by comparing various other wheel speeds.

3. The apparatus as claimed in claim 1 wherein said fifth means is connected with a limiting circuit to deliver an output signal when said comparison signal attains a predetermined value.

4. The apparatus as claimed in claim 1 wherein said third and fourth means are adapted for determination of respective time constants, the time constant of said third means being larger than that of said fourth means.

5. The apparatus as claimed in claim 4 wherein said comparison signal produced by said fifth means is responsive to said respective time constants.

6. The apparatus as claimed in claim 3 wherein said fifth means is adapted for providing a ratio between said remaining wheel speed and said pseudo vehicle speed.

7. The apparatus as claimed in claim 6 wherein said fifth means is adapted for delivery of an output signal when said remaining wheel's rotational speed drops to less than 20 percent of said pseudo vehicle speed.

* * * * *